C. G. GOETZ & B. PIECHOWSKI.
CIRCULAR CROSSCUT SAW FILING MACHINE.
APPLICATION FILED FEB. 23, 1909.
953,134.
Patented Mar. 29, 1910.
2 SHEETS—SHEET 2.
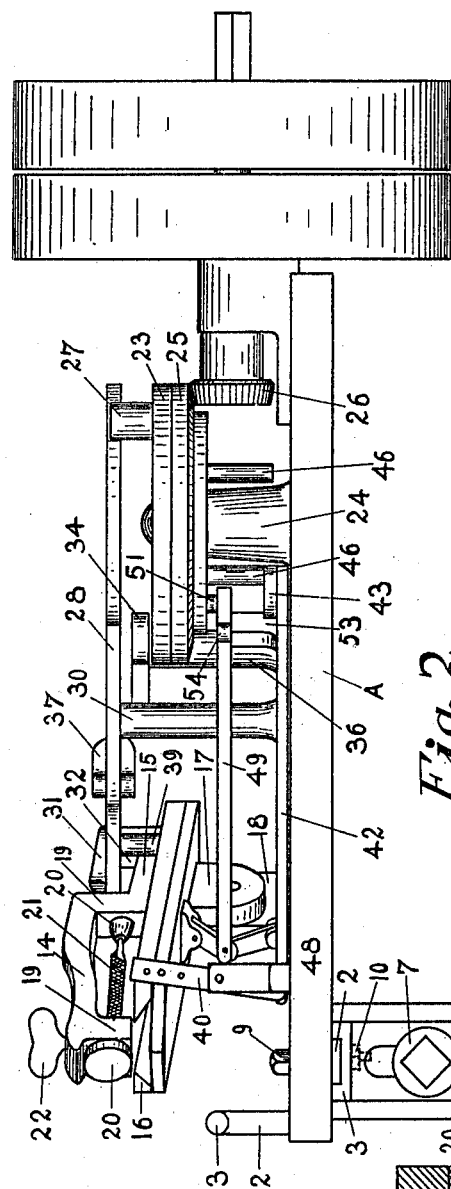
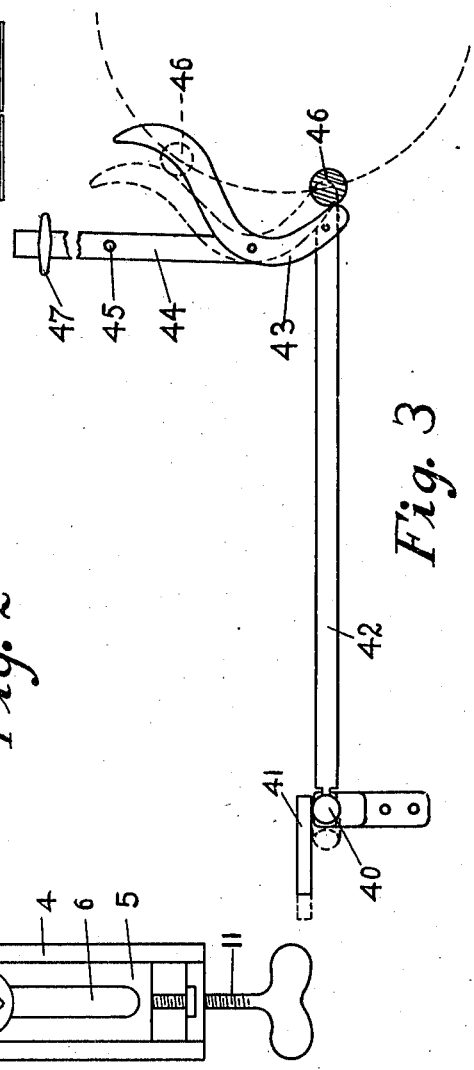
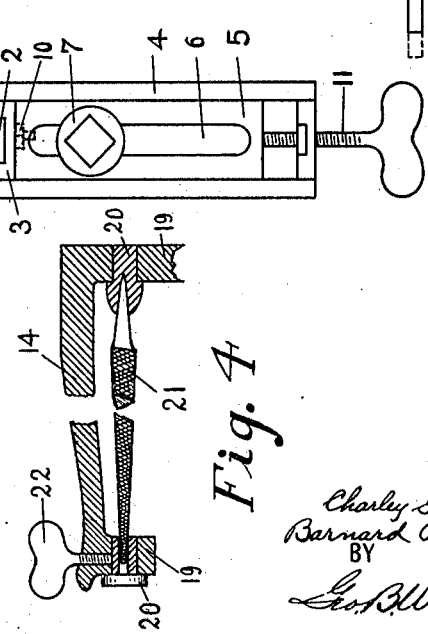
WITNESSES:
J. Ray Abbey
Ralph S. Warfield
INVENTORS
Charley G. Goetz and
Barnard Piechowski
BY
Geo. B. Willcox
ATTORNEY

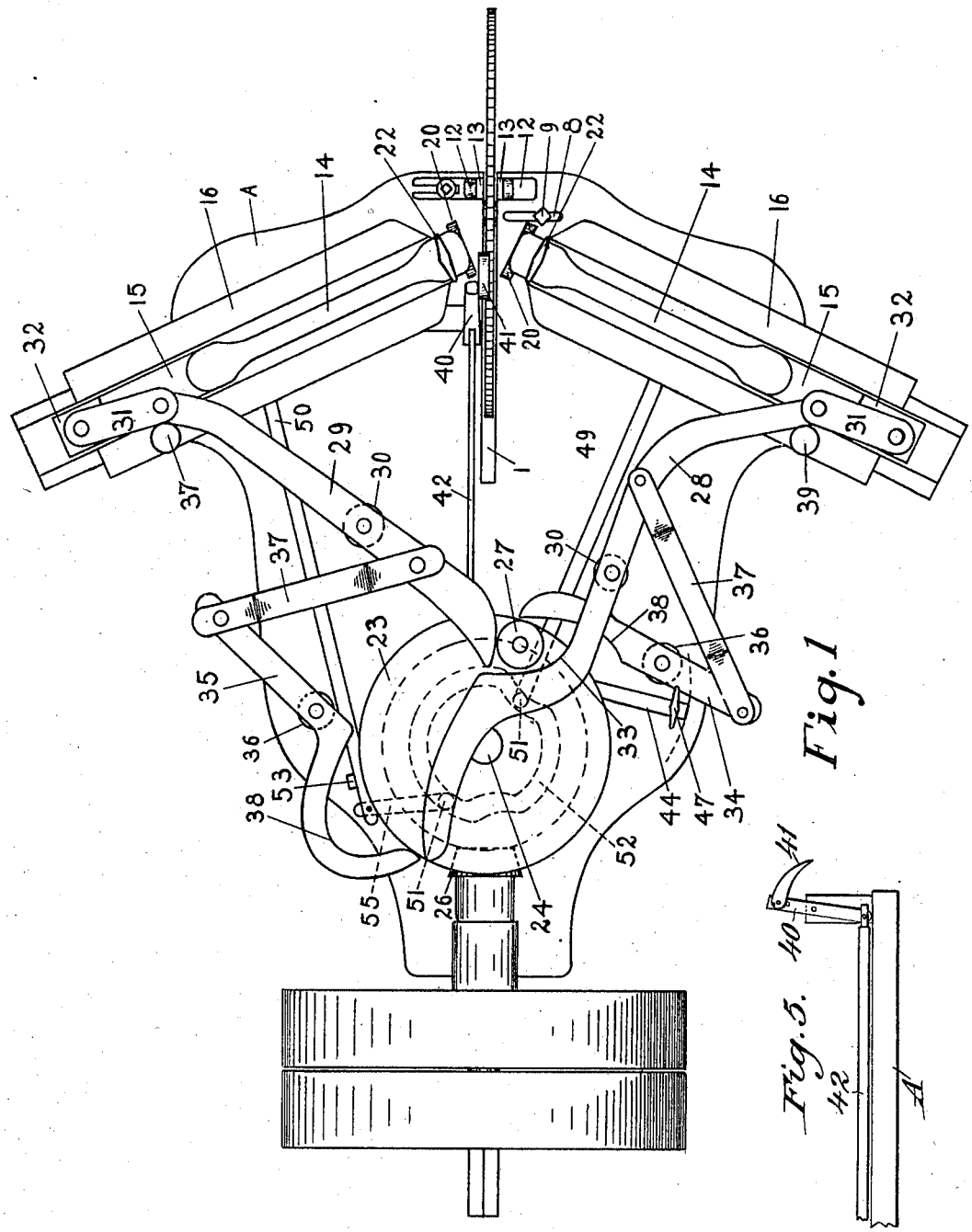

UNITED STATES PATENT OFFICE.

CHARLEY G. GOETZ AND BARNARD PIECHOWSKI, OF BAY CITY, MICHIGAN.

CIRCULAR-CROSSCUT-SAW-FILING MACHINE.

953,134. Specification of Letters Patent. Patented Mar. 29, 1910.

Application filed February 23, 1909. Serial No. 479,455.

*To all whom it may concern:*

Be it known that we, CHARLEY G. GOETZ and BARNARD PIECHOWSKI, citizens of the United States, residing at Bay City, in the county of Bay and State of Michigan, have jointly invented certain new and useful Improvements in Circular-Crosscut-Saw-Filing Machines; and we do hereby declare the following to be a full, clear, and exact description of the invention, such as will enable others skilled in the art to which it appertains to make and use the same.

Our invention relates to saw sharpening machines, and in the drawings and following description, we have shown our invention arranged for sharpening circular cross-cut saws. It is obvious that the use of our invention is not restricted solely to circular saws, however.

One object of our invention is the provision of a more simple and inexpensive mechanism than has heretofore been devised, so far as we are aware, for sharpening cross-cut saws.

Another object is the provision of a device of this character comprising a novel arrangement of parts for supporting and feeding the saw step-by-step.

Still another object is the provision of a machine wherein the actual saw sharpening member is moved in a manner like that pursued heretofore by an operator in sharpening saws by hand.

A further object is the provision of a machine which will sharpen both sides of a tooth successively.

A still further object is the provision of means for grinding the saw and eliminating vibration.

To these and other ends, our invention consists in the provision of suitably mounted files movable successively in intersecting planes through mechanically actuated mechanism together with means for supporting the saw, and for feeding it step-by-step.

Our invention further consists in certain novel features and combinations such as will be more fully described hereinafter and particularly pointed out in the claims.

In the accompanying drawings, Figure 1 is a top plan view of one form of our invention, Fig. 2 is a side view, and Figs. 3, 4 and 5 are detail views.

Heretofore cross-cut saws have been sharpened by machinery employing emery or similar wheels carried by reciprocatory sashes, it being necessary to partially twist or rotate the wheel to cause it to sharpen the adjacent faces of each two teeth, then raise the wheel, rotate the saw and lower the wheel into the next throat or gullet. These machines are costly, occupy considerable space and contain much complicated machinery, which easily gets out of order.

It is our intention to provide a simple compact machine consisting of as few parts as possible and one which can be placed on the market at a comparatively low figure.

Referring to the drawings, A indicates any suitable base supported in any convenient manner, not shown. The base is provided with a slot 1 capable of receiving saws of any usual gage.

As one means for supporting the saw being operated upon we preferably provide a rail 2 secured to the under face of the base near the outer free end of the slot and extending transversely thereto. A guide 3 having a way formed therein is received on the rail and a hanger 4 depends from such guide, the hanger containing a sash 5 movable vertically therein and having a slot 6 in which one end of a mandrel 7 is adjustably received and held in any convenient manner. In order to adjust the hanger laterally relative to the slot 1, depending upon the gage or thickness of the saw, we provide an elongated aperture 8 through the rail and base to receive a bolt 9 carrying a nut 10 for releasably retaining the hanger and saw in any adjusted position, with the saw projecting through the slot 1.

As one means for providing a vertical adjustment of the saw relative to the sharpening mechanism, we mount the saw-carrying mandrel in a sash which rests upon a screw 11 carried by the hanger.

In order to prevent vibration of the saw and to serve as a guide for the latter as it is rotated, we provide the knees 12, 12 located on opposite sides of the slot 1. These knees are equipped with cushions 13, 13 adapted to engage the saw, and one or both knees may be adjusted toward and from the slot, one knee only being shown adjustable. This adjustment is for the purpose of accommodating saws of different gages.

One arrangement of means for sharpening the teeth of cross-cut saws embodying our invention, is shown in the drawing, the same comprising a pair of bows 14, 14 mounted on slides 15, 15 received in pivotally supported or rocking guide ways 16 arranged on different horizontal planes. These guide ways are arranged at an angle to each other and guide the file carrying bows to impart the required shear or bevel to the sides of the teeth. The pivotal support of the guides is accomplished by providing each guide with a depending rocker 17 received between a pair of stationary rocker standards 18 on the base. The depending lugs 19 of each bow are apertured to receive the recessed holders 20, such holders being made adjustable in the apertures for convenience in bringing into use new faces on the file 21. The opposite ends of the file are received in the recesses in the holders and a set screw 22 retains one of said holders in adjusted position and prevents the disengagement of the holder and bow. The holders are shouldered to limit their movement in one direction. The bows travel in intersecting paths and in our invention we prefer to reciprocate the bows outward and backward alternately. Thus, while one bow is making one full outstroke and is then returned to its normal retracted position, the remaining bow is stationary. It is also advisable to effect the return of the bow to its normal retracted position quickly and as one means for actuating the files, we may provide the following mechanism as one of many constructions for effecting our purpose. A horizontally disposed disk 23 is journaled on a stud shaft 24 projecting vertically from the base, the disk being rotated in any convenient manner as by a rack 25 and pinion 26 actuated from any convenient source of power or by hand. A roll 27 carried by the disk is adapted to successively engage the cam faced free ends of two curved levers 28 and 29 pivoted to the posts 30 respectively, the opposite ends of the respective levers being connected by links 31 to raised abutments 32 on the slides 15 of the respective bows 14. The free cam ends of the lever 28 overlie the disk and are successively engaged by the roll 27 at substantially diametrically opposite points in its travel, such engagement operating to throw or project the file carrying bows outward across and in contact with the sides of the teeth. The two levers 28 and 29 lie in different horizontal planes so as to pass each other in their swinging movements and lever 28 is cut away as at 33 to avoid contact with the roll when its slide is brought back to normal retracted position. In order to retract the slides alternately, we provide jointed quick return levers comprising the levers 34 and 35 pivoted intermediate their ends to posts 36, the outer ends of the levers being pivotally secured to connecting rods 37 which, in turn are pivoted to the curved projecting levers 28 and 29. The inner free ends of the retracting levers 34 and 35 are hooked or recessed as at 38 and lie in the path of movement of the roll 27 at substantially diametrically opposed points relative to the disk. The free ends of the quick return retracting levers also lie behind the cam faced ends of the projecting levers. That is to say, the roll will first engage the cam faced end of the lever, the operation of which projects one of the slides, the continued revolution of the roll next causing its engagement with the free end of the retracting lever controlling the return of the same slide to normal position, after which the roll will successively engage the respective projecting and retracting levers of the remaining slide. The engagement of the roll with the retracting levers operates to swing the projecting levers in a direction opposite to that imparted to them when engaged by the roll. The actuation of the retracting levers operates to quickly return the slides and connected parts to retracted position, such movement also being communicated to the levers and owing to the location of lever 28, its quick return movement would cause it to overtake and engage the roll if it (the lever) were not cut away as at 33. Stops 39 are provided on the guides to limit the movement of the levers on the return stroke of the files.

From the foregoing it will be seen that the files travel in intersecting planes and that one file is projected into and withdrawn out of the path of movement of the opposite file, the files being alternately actuated.

As one means for effecting a step-by-step feed of the saw, such feed taking place during the retraction of the sharpening members, we provide a pivotally supported finger 40 adapted to swing in a vertical plane adjacent the saw receiving slot 1. A dog 41 is pivotally connected to the free end of the finger and is receivable in the throats of successive teeth to feed the saw forward step-by-step. The dog is adjustable on the finger for saws of varying sizes, and to this end the upper end of the finger is provided with a series of perforations, as shown in Fig. 2, the dog being omitted for the sake of clearness. The finger extends upward from the base substantially parallel with the saw, and a connecting rod 42 pivoted to the lower end of the finger extends to a reverse cam lever 43 pivotally mounted on one end of a swinging bar 44 pivoted to the base as at 45. Depending from diametrically opposite points on the under face of the disk are the pins 46, 46 adapted to contact successively with the convex and concave faces respectively of the reverse cam lever to reciprocate the connecting rod and oscillate the feed finger. The engagement of a pin 46 with the convex face is timed to occur when one of the levers 28 or 29 has returned its sharpening member partway to retracted position, and operates to throw the feed finger forward to move the saw around one tooth. This movement of the convex face of the cam lever throws the concave face into the path of movement of the pin by which it is next engaged, such engagement operating to withdraw the feed finger and its dog out of the path of movement of the sharpening members and permitting the dog to engage the succeeding tooth in readiness for the next oscillation. It also operates to throw the convex face of the cam lever back into the path of movement of the pins 46. In order to permit an adjustment of the feed finger for a longer or shorter throw, depending upon the size of the teeth of the saw and their arrangement, we have secured the swinging bar 44 pivotally to the base and provided a set screw 47 or other fastening means at or near its outer end to retain the bar in any adjusted position. When it is desirable to vary the throw of the feed finger, the bar is swung in one direction or the other, such motion being transmitted to the finger to normally hold the latter in a position advanced more or less toward the saw.

In a machine constructed in accordance with our invention, wherein there are two successively reciprocated sharpening members traversing intersecting paths, it is necessary, in order to further simulate the motions of an operator sharpening a saw by hand, that the sharpening members be raised when they have completed their out stroke. This raising of the saw sharpening members not only prevents injury to the sides of the teeth just previously sharpened, but also permits the step-by-step movement of the saw. To effect the elevation of the sharpening members, we may employ the following arrangement of parts as one convenient construction. It will be remembered that the guide ways 16 are pivotally mounted near their outer or rear ends. In order to control the positions of these guide-ways, we place a toggle lever 48 between the under face of each guide-way and the base. Longitudinal bars 49, 50, extend from the joint of each toggle lever to substantially diametrically opposite points beneath the disk 23, a roll 51 being carried on the inner end of one of such bars and receivable in a cam groove 52 on the under face of the disk. The bars may be slidingly supported intermediate their ends on rests 53, the bars extending between anti-friction rolls 54 carried by the rests. The bar 50 is provided with a link 55 bearing a roll 51 received in the cam groove. The operation of this portion of our invention is as follows: The toggles remain in extended position when the sharpening members are retracted. As the disk rotates, the offset portion of the cam groove engages the roll on bar 49, for instance, just subsequent to the engagement of the roll 27 with the cam faced end of lever 28. The continued movement of the disk causes the offset portion of the cam groove to force the bar 49 laterally outward to break its toggle and lower the guide-way. The guide is not lowered until the forward end of the bow has passed above the edge of the saw. The saw sharpening member falls in the throat between two adjacent teeth of the saw and as it is projected, it sharpens the teeth by beveling the two opposed sides of the throat. When the sharpening member has been projected to its farthest limit of movement, and prior to its retraction, the cam groove exerts a push on the bar 49 to extend the toggle which operates to raise the guide-way, and immediately subsequent thereto, the roll 27 engages the recessed end of the retracting lever 34 to withdraw the sharpening member to normal inoperative position. Simultaneously with the retraction of the sharpening member, the pin 46 engages the convex face of the reverse cam lever 43 to throw the feed finger forward and advance the saw one step. Then as the roll 27 engages the projecting lever 29 of the remaining sharpening member, the pin 46 engages the concave face of the reverse cam lever to retract the feed finger, after which the foregoing operation is repeated with said remaining sharpening member.

From the foregoing it will be seen that we have devised a perfectly synchronized compact machine which will fulfil every purpose of the more expensive machines now on the market for doing this class of work. It is also evident that many changes might be made in the form and arrangement of the several parts described without departing from the spirit and scope of our invention.

Having thus fully disclosed our invention, what we claim as new, is:—

1. A saw sharpening machine comprising a longitudinally reciprocatory sharpening member, a lever for projecting the member in one direction, revoluble means engaging the lever for imparting movement thereto in one direction, and means subsequently engaged by the revoluble means for returning the lever and member to retracted position.

2. A saw sharpening machine comprising a longitudinally reciprocatory sharpening member, a revoluble means, levers successively engaged by the revoluble means for alternately projecting and retracting the sharpening member longitudinally, and means for moving the sharpening member laterally into and out of contact with the work.

3. A saw sharpening machine comprising a longitudinally reciprocatory pivotally supported member, a revoluble element, levers successively engaged by the element for alternately projecting and retracting the sharpening member longitudinally, and means for raising and lowering the member to cause its disengagement from and engagement with the work.

4. A saw sharpening machine comprising a sharpening member supported for longitudinal reciprocatory and lateral movement, a saw supporting means, a saw feeding means, a rotatable element, a revoluble member carried by the element, levers successively engaged by the revoluble member for alternately projecting and retracting the sharpening member longitudinally, a bar actuated by the rotation of the element for alternately moving the sharpening member laterally to engage it with and disengage it from the saw, the operation of the bar being synchronized relative to the reciprocation of the member to engage the member with the saw immediately subsequent to the commencement of the outstroke of the member, and to disengage the member from the saw prior to its retraction, a revoluble stud carried by the element and adapted to actuate the saw feeding means while the member is out of engagement with the saw.

5. A saw sharpening machine comprising a sharpening member supported for longitudinal reciprocatory and lateral movement, a rotatable element, a revoluble member carried by the element, levers successively engaged by the revoluble member for alternately projecting and retracting the sharpening member longitudinally, a bar actuated by the rotation of the element for alternately moving the sharpening member laterally to engage it with and disengage it from the saw, the operation of the bar being synchronized relative to the reciprocation of the member to engage the member with the saw immediately subsequent to the commencement of the outstroke of the member, and to disengage the member from the saw prior to its retraction.

6. A machine for sharpening the teeth of cross-cut saws comprising a plurality of saw sharpening members arranged at an angle to each other and supported for longitudinal reciprocatory movement in intersecting paths, a rotatable element constituting a prime mover, a revoluble means on the rotatable element, levers engaged by the revoluble means for alternately projecting and retracting the saw sharpening members successively, and means also directly actuated by the prime mover in synchronism with the actuation of the sharpening members longitudinally, for successively engaging the respective members with and disengaging them from the saw.

7. A machine for sharpening the teeth of cross-cut saws comprising a plurality of saw sharpening members arranged at an angle to each other and supported for longitudinal reciprocatory movement in intersecting paths, a rotatable element constituting a prime mover, a revoluble means on the rotatable element, levers engaged by the revoluble means for alternately projecting and retracting the saw sharpening members successively, means also directly actuated by the prime mover in synchronism with the actuation of the sharpening members longitudinally, for successively engaging the respective members with and disengaging them from the saw, and saw feeding means actuated directly from the prime mover for feeding the saw during the disengagement of the respective sharpening members therewith.

8. A saw sharpening machine comprising a sharpening member mounted for longitudinal reciprocatory movement, a lever connected with the member, a rotatable element, a revoluble means carried by the rotatable element and adapted to wipe against the lever to actuate the sharpening member longitudinally in one direction, and a broken lever connected at one end to the first named lever, the opposite end of the broken lever lying in the path of movement of the revoluble member and actuated thereby to return the sharpening member to retracted position.

9. A saw sharpening machine comprising a sharpening member mounted for longitudinal reciprocatory movement, a lever connected with the member, a cam face on the lever, a rotatable element, a revoluble means carried by the element and adapted to wipe against the cam face, and a broken lever, one end of which is connected to the first named lever, the opposite end being recessed and lying in the path of movement of the revoluble means.

10. A saw sharpening machine comprising a sharpening member supported for longitudinal reciprocatory movement, a pivotally supported lever connected at one end with the member, a sectional lever, one section of which is pivotally supported, the remaining section being pivotally connected to the first-named lever, a rotatable element, the inner ends of the respective levers lying adjacent the rotatable element, and revoluble means carried thereby and adapted to engage the levers successively.

11. A saw sharpening machine comprising a pivotally supported guide-way, a sharpening member slidably received and reciprocating in the guide-way, means for actuating the sharpening member, and means synchronized with the reciprocation of the sharpening member for swinging the guideway on its pivotal support.

12. A saw sharpening machine comprising a pivotally supported guide-way, a sharpening member slidably received and reciprocating in the guide-way, means for actuating the sharpening member, a toggle lever, one end of which is connected with the guide-way, and means for extending and breaking the toggle.

13. A saw sharpening machine comprising a pivotally supported guide-way, a sharpening member slidably received and reciprocating in the guide-way, means for actuating the sharpening member, a toggle lever, one end of which is connected with the guide-way, a suitably guided bar connected to the toggle, a roll carried by the bar, and a rotatable element having a cam groove therein in which the roll is received.

14. A saw sharpening machine comprising a sharpening member, an oscillatory feed finger projecting to a point adjacent the saw, a reverse cam lever connected to the finger, the lever being pivoted intermediate its operative convex and concave faces and a revoluble pin adapted to engage the convex and concave faces successively of the lever to actuate the finger.

15. A saw sharpening machine comprising a sharpening member, an oscillatory feed finger projecting to a point adjacent the saw, a lever connected to the finger, means for actuating the lever, and an adjustable swinging bar to which the lever is secured.

16. A saw sharpening machine comprising a suitable slotted table, a saw support beneath the table and adjustable laterally toward and from the slot, a saw feeding mechanism, and a saw sharpening member.

17. A saw sharpening machine comprising a slotted table, a hanger beneath the table and adjustable laterally toward and from the slot, a sash slidable in the hanger, means for adjusting the sash in the hanger, and saw supporting means carried by the sash.

18. A saw sharpening machine comprising a suitable slotted table, a saw support beneath the table, adjustable relative to the slot, a saw feeding mechanism, a saw sharpening member, and cushioning means supported on the table on opposite sides of the walls of the slot, for preventing vibration of the saw.

In testimony whereof, we affix our signatures in presence of two witnesses.

CHARLEY G. GOETZ.
BARNARD PIECHOWSKI.

Witnesses:
Geo. B. Willcox,
Ralph S. Warfield.